United States Patent

Kwon et al.

[11] Patent Number: 5,772,301
[45] Date of Patent: Jun. 30, 1998

[54] DISPLAY COMBINED WITH SLIDE PROJECTOR AND LIQUID CRYSTAL PROJECTOR

[75] Inventors: Soon Hyung Kwon; Keun Bae Kim, both of Seoul, Rep. of Korea

[73] Assignee: LG Electronics Inc., Seoul, Rep. of Korea

[21] Appl. No.: 526,958

[22] Filed: Sep. 13, 1995

[30] Foreign Application Priority Data

Sep. 15, 1994 [KR] Rep. of Korea ............... 23428/1994

[51] Int. Cl.⁶ .................................................. G03B 21/14
[52] U.S. Cl. ................................................ 353/122; 353/94
[58] Field of Search .......................... 353/71, 94, 119, 353/122

[56] References Cited

U.S. PATENT DOCUMENTS

| | | | |
|---|---|---|---|
| 4,331,397 | 5/1982 | Jewison | 353/71 |
| 5,376,979 | 12/1994 | Zarracky et al. | 353/122 |
| 5,396,304 | 3/1995 | Salerno et al. | 353/122 |
| 5,428,415 | 6/1995 | Keelan et al. | 353/71 |
| 5,461,437 | 10/1995 | Tauaka et al. | 353/71 |

*Primary Examiner*—William Dowling
*Attorney, Agent, or Firm*—John P. White

[57] ABSTRACT

A display combined with a slide projector and liquid crystal projector is disclosed including a light source for emitting light, light collecting means for collecting light emitted from the light source, and image display device having image information so as to enlarge and project an image displayed on the image display device. The image display device includes a first display device for receiving electrical video information and converting it into optical video information; a second display device in which video information is recorded optically; and selecting means for selecting the first or second display device.

18 Claims, 10 Drawing Sheets

F I G.8
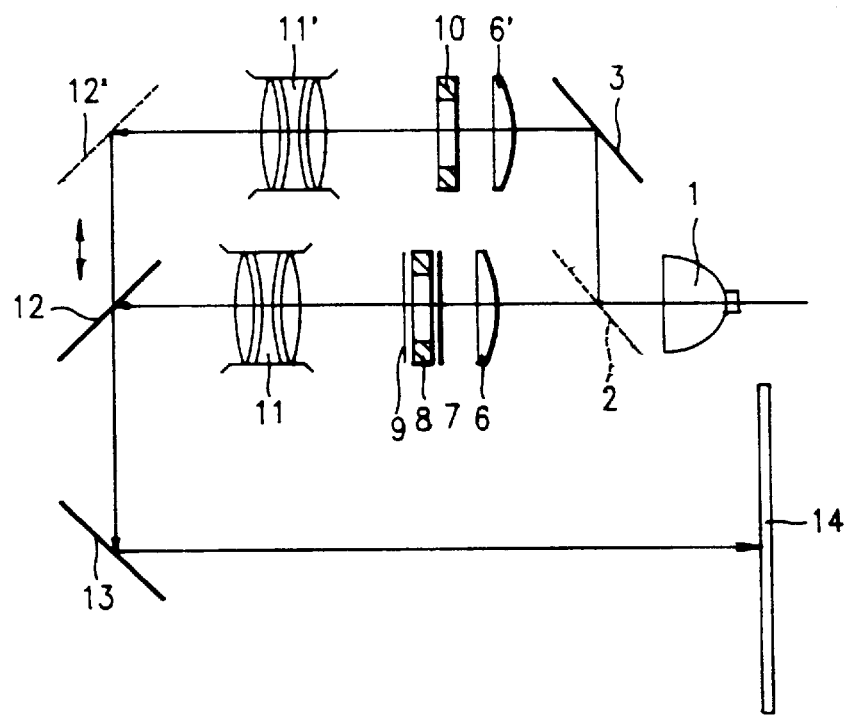
F I G.9
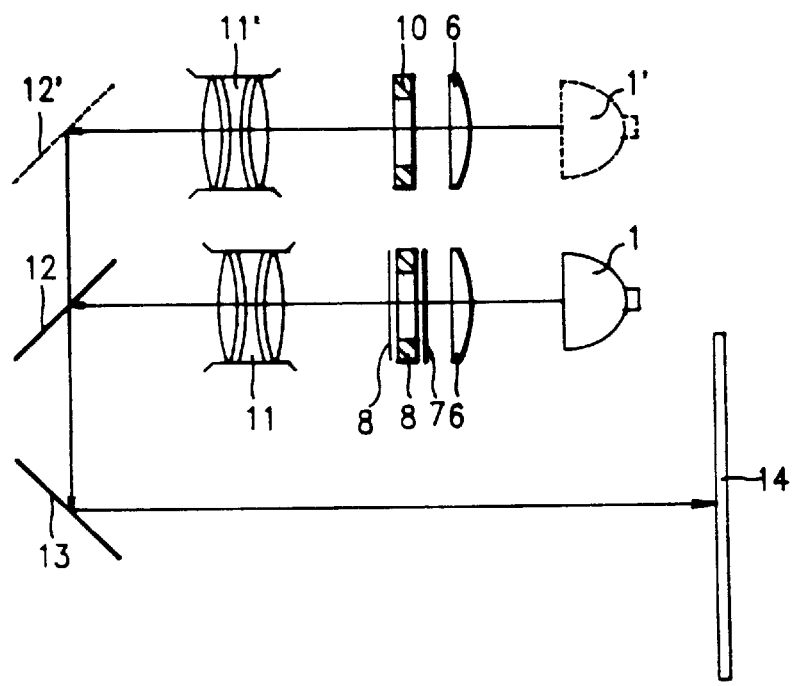

F I G. 10
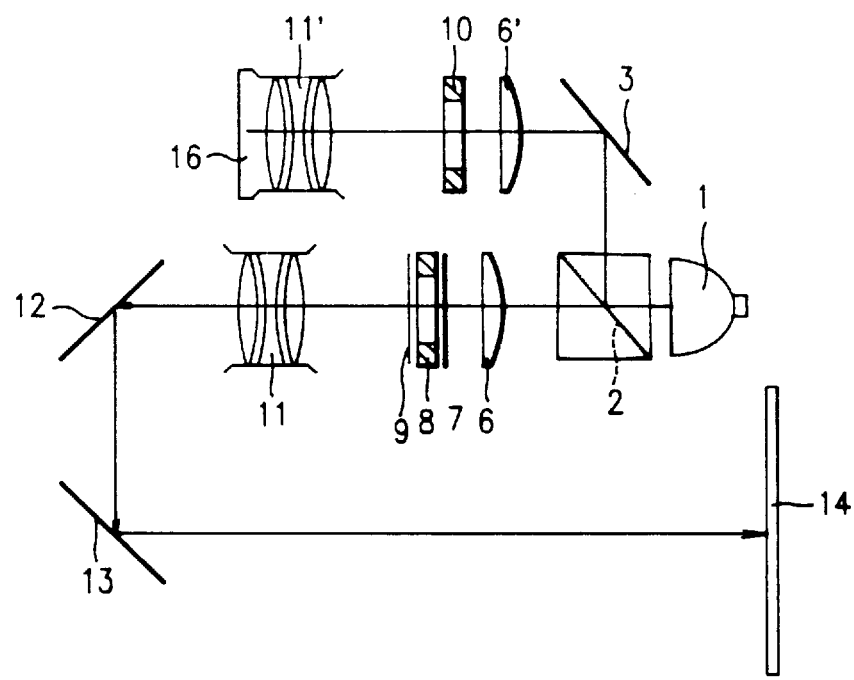
F I G. 11
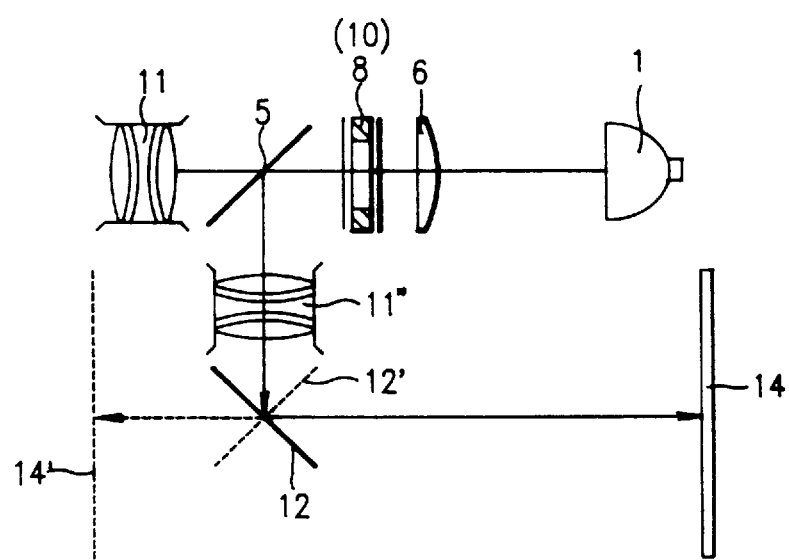

F I G. 12
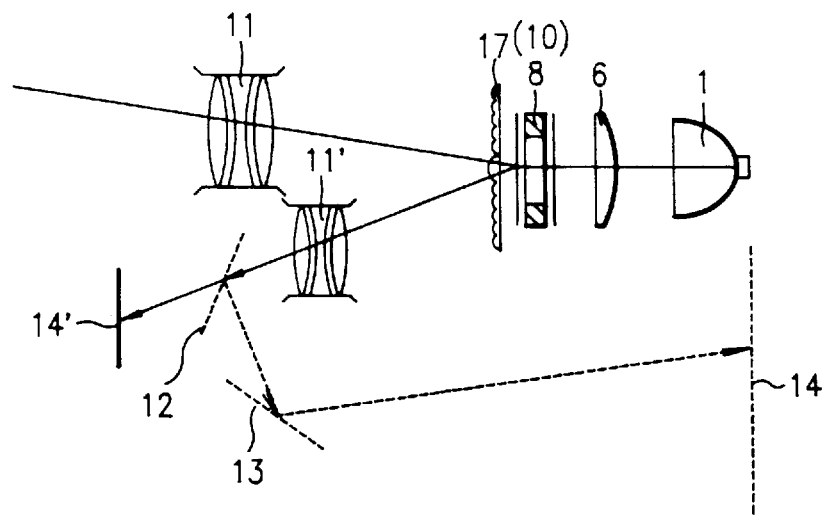
F I G. 13
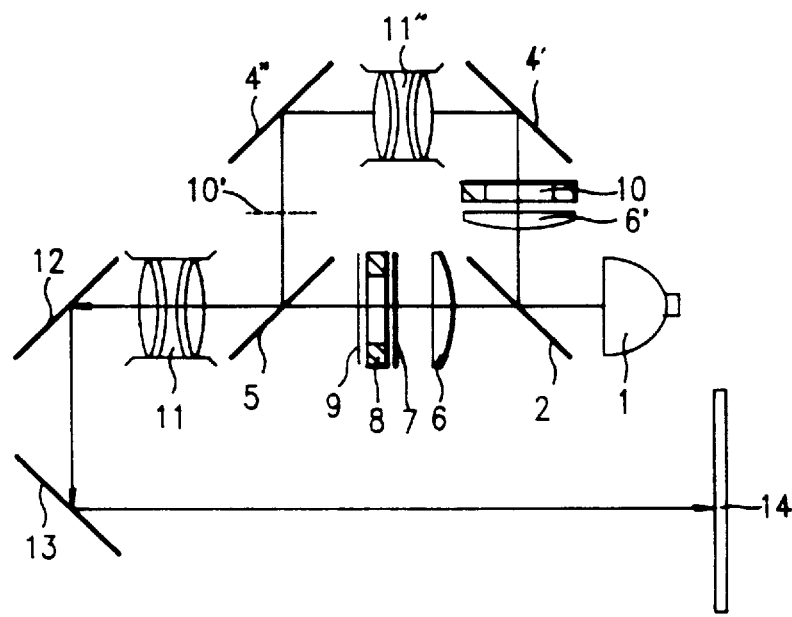

F I G.14
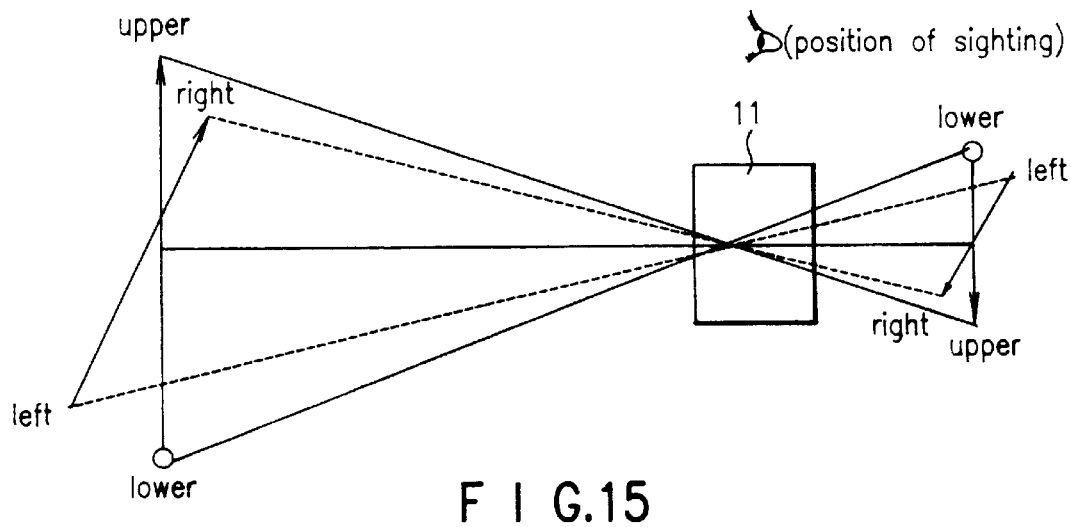
F I G.15
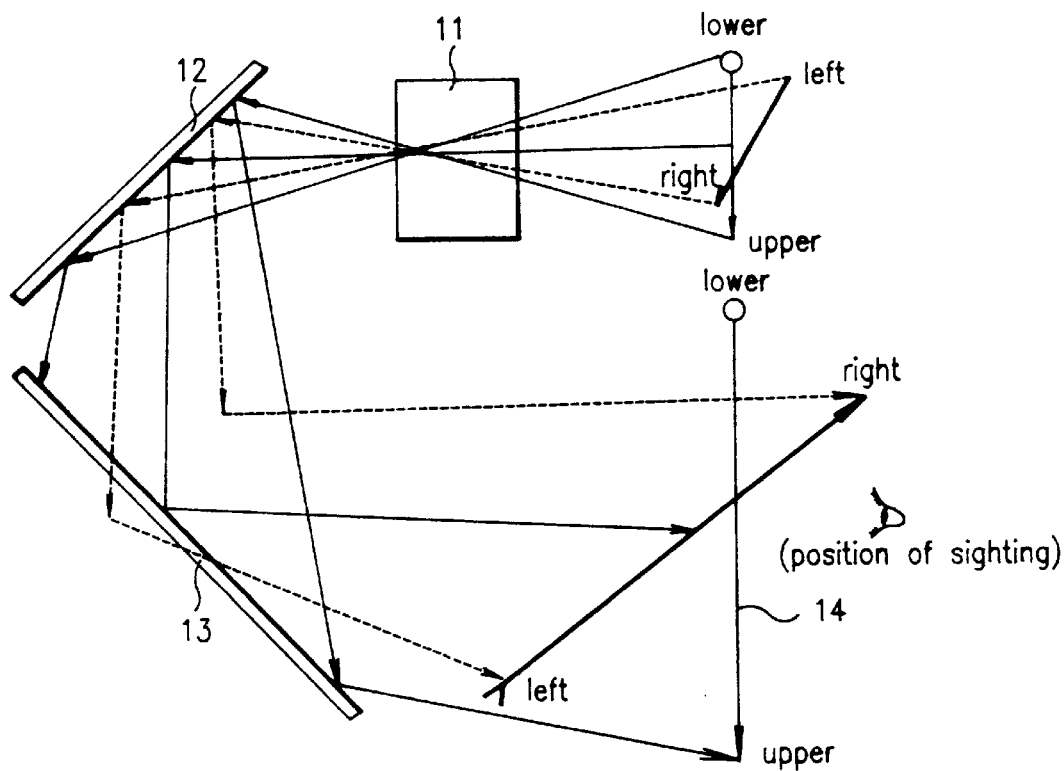

DISPLAY COMBINED WITH SLIDE PROJECTOR AND LIQUID CRYSTAL PROJECTOR

BACKGROUND OF THE INVENTION

The present invention relates to a display, and more particularly, to a display combined with a slide projector and liquid crystal projector in which a liquid crystal projector and slide projector are integrated and front projection and rear projection for a monitor are enabled in this integrated system.

A projector is to form an enlarged image on the screen via a small display device (slide film, liquid crystal or movie film) and a projection lens. FIG. 1 shows an optical system of a projector using a liquid crystal display (LCD). Referring to FIG. 1, the system comprises a light source 101 for emitting light, a light collector 102 for efficiently irradiating the light emitted from light source 101 onto an LCD 103, LCD 103 (including a polarizing plate) for converting input electrical image information into optical image information, and a projection lens 104 for enlarging and projecting the image information displayed on LCD 103 onto a screen 105. The operation of the liquid crystal projector will be described below.

When electrical image information, a video source output from a video cassette recorder, laser disk player, tuner or computer, is input to LCD 103, the input signal is applied to LCD 103, a light receiving device, by an LCD controller (not shown). Then, the electrical image information is displayed on LCD 103.

As the light emitted from light source 101 passes through LCD 103 to which image information is input, the electrical image information is converted into optical image information and thus displayed on LCD 103. This information is enlarged and projected on screen 105 via projection lens 104 so that the electrical image source is optically converted and displayed on the screen. Here, the display device of a light receiving transmissive flat panel for converting the electrical image information into the optical image information is similar to the above-mentioned device in configuration and operation principle.

FIG. 2 shows a slide projector using slide films. The optical configuration and operation of this projector is almost the same as those of the liquid crystal projector, except that positive slide films are used instead of an LCD. In other words, it is merely different that the means of inputting image information is slide film 103a input from slide film tray 103b, not an electrical signal. In this drawing, reference numeral 103c indicates a slide film detaching/attaching device.

Meanwhile, as their light source, ordinary LCD projectors use a metal halide lamp whereas slide projectors use a halogen lamp. The metal lamp is superior in color rendering, duration, brightness, and efficiency. However, it is expensive and undesirably requires a ballast for driving the lamp.

With the full-scale development on polysilicon LCDs, at present, there has been presented an LCD having 3 hundred thousand pixels (NTSC level) in 1.3-inch size. An ordinary slide film is, similarly, 1.7 inch (36 mm×24 mm). Display devices have been developed for the purpose of multi-function and multi-usage as the concept of multimedia is introduced.

For example, there was suggested a liquid crystal projector which displays multi-sync signal processing or data output from a computer on a large screen by coupling them directly to a display set, not printing them separately. This projector displays video information or other data, using the same display set.

For another example, there was suggested a composite product which easily changes images to be supplied to overhead projection (OHP) films and LCD by putting a large (10-inch level) LCD on an OHP projector. This broadens its usage.

SUMMARY OF THE INVENTION

Therefore, it is an object of the present invention to provide a display combined with a slide projector and liquid crystal projector for displaying slide films or video images according to usage mode conversion, by forming the liquid crystal projector and slide projector as one set, which have the same basic configuration and similar-sized display devices.

It is another object of the present invention to provide a display combined with a slide projector and liquid crystal projector for enhancing the range of the usage environment by including front- and rear-type monitor functions.

To accomplish the objects of the present invention, there is provided a display combined with a slide projector and liquid crystal projector comprising a light source for emitting light, light collecting means for collecting light emitted from the light source, and image display device having image information so as to enlarge and project an image displayed on the image display device, the image display device comprising: a first display device for receiving electrical video information and converting it into optical video information; a second display device in which video information is recorded optically; and selecting means for selecting the first or second display device.

BRIEF DESCRIPTION OF THE ATTACHED DRAWINGS

FIGS. 3–6 and 8–13 show first to tenth embodiments of a combined slide and projector of the present invention;

FIG. 14 illustrates screen reversal of a projection lens and viewing state in front projection;

FIG. 15 illustrates the reversal of top and bottom of image by general two mirrors;

DETAILED DESCRIPTION OF THE INVENTION

Figure 1:
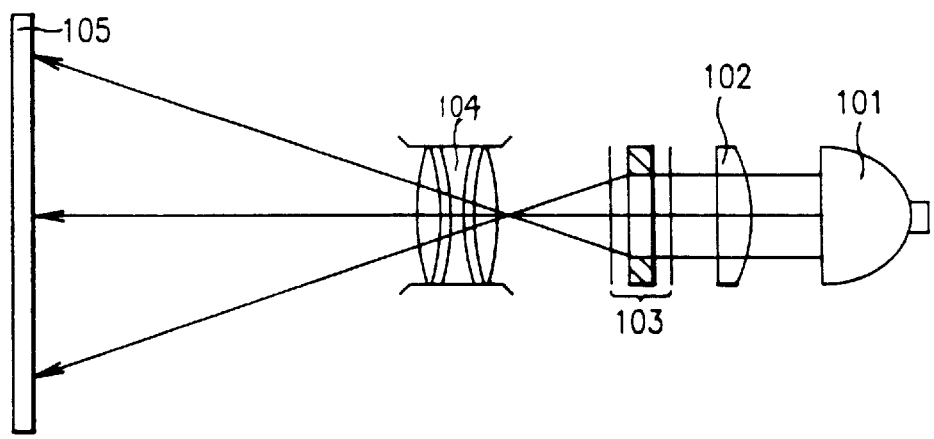
FIG. 1 shows a configuration of a general liquid crystal projector.
Figure 2:
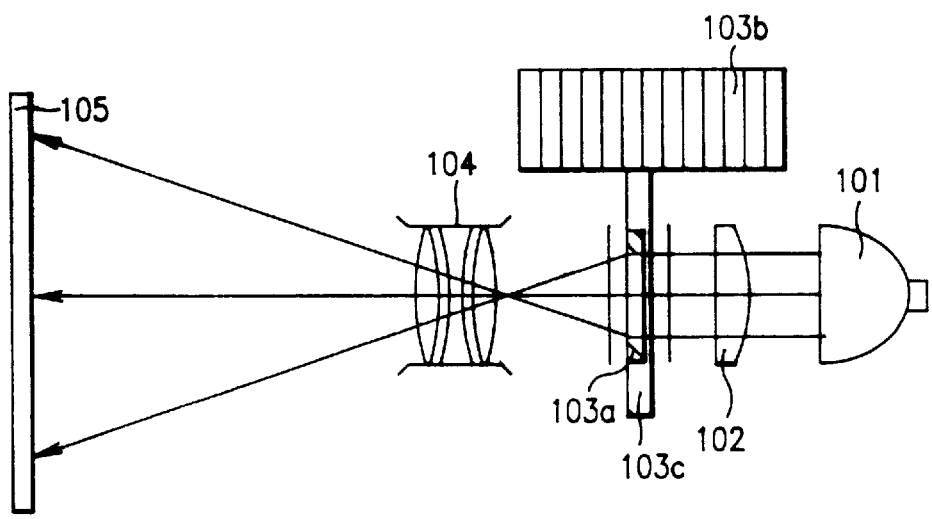
FIG. 2 shows a configuration of a general slide projector.

Basically, embodiments of the present invention each comprise a light source 1, light irradiating selector 2, image forming selector 5, light collectors 6 and 6', electrical image display portion 8 (LCD or flat panel), slide film portion 10, projection lens 11, light path converting portions 12 and 13, screen portions 14 and 15, slide film container or tray (not shown), and slide film exchanging portion. This configuration can be modified into other forms. First of all, the first embodiment of the present invention will be described, facilitating the description of specific configuration and operation principle.

First Embodiment

Figure 3:
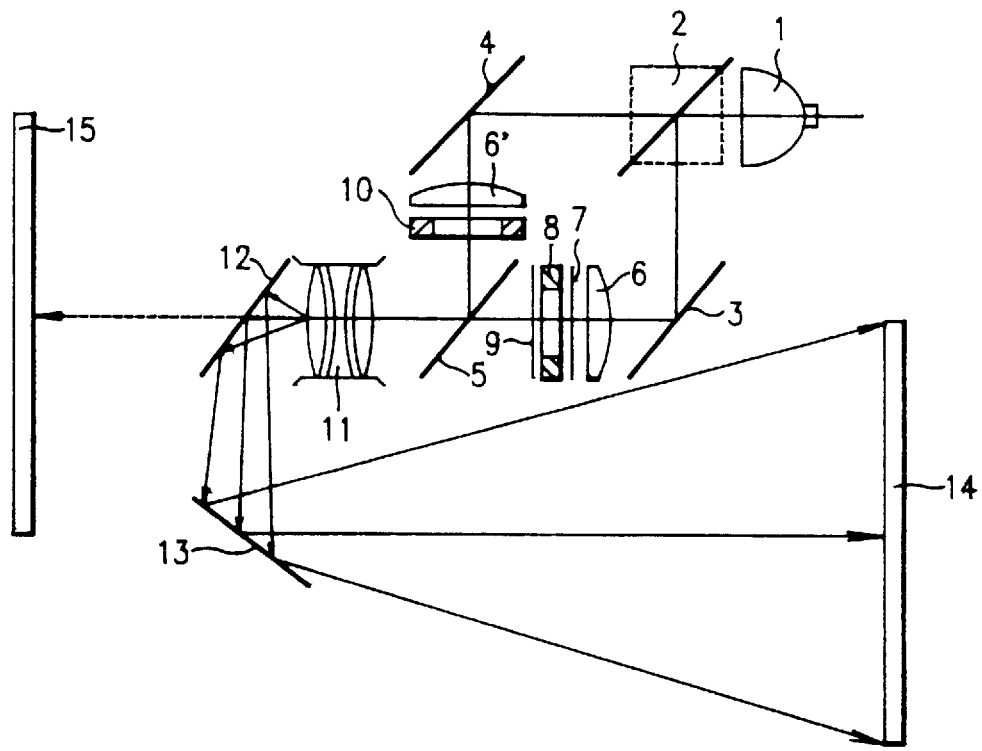

FIG. 3 is a vertical and horizontal sectional view of the first embodiment of the present invention, showing an optical system enabling LCD/slide and front/rear projections. In this configuration, light source 1 and projection lens 11 are commonly used with respect to the front/rear projection and LCD/slide projection.

More specifically, light emitted from light source 1 is irradiated onto LCD 8 by mirror 2 and then converted into optical image information. Here, pre-reflection mirror 5 is opened to the light path of LCD 8 so that the image information is enlarged and projected onto front screen 15 via projection lens 11. In the case of front projection, pre-reflection mirror 12 is opened. In this case, opening means that a mirror placed at 45° with respect to the light path is rotated 45°, taking as the axis the top of image of the mirror, to thereby open the light path. This may include the movement of mirror.

Light to be incident on slide film 10 is interrupted by pre-reflection mirror 2, having, optically, only the light path of LCD 8. By doing so, the slide portion is not operated.

For the slide projector, light emitted from light source 1 is reflected by pre-reflection mirror 4 and irradiated onto slide film 10 as pre-reflection mirror 2 opens. When pre-reflection mirror 5 is closed, the light is reflected to be enlarged and projected on front screen 15 by projection lens 11. Front screen 15 is illustrated only in the first embodiment and will be omitted in other embodiments. For the slide projector, pre-reflection mirror 12 is opened. Here, when pre-reflection mirror 2 is opened, light is not irradiated to LCD 8 so that optically, only the slide projector is operated. In this case, in order to reduce electrical loss, it is required not to operate the electrical signal input to LCD 8 using a circuit.

For rear projection, when pre-reflection mirror 12 is closed, the path of the image of LCD 8 or slide film 10 is changed by pre-reflection mirror 13 via projection lens 11 so that the image is rear-projected on front screen 14 for the rear monitor. Here, in rear-projection for monitor, its screen area with respect to the front projection is relatively very small so that the screen brightness is inversely proportional to the square of size. In other words, in case of 10-inch size, brightness becomes about 100 times that of 100-inch size in front projection. Even in bright environment, a sharp image can be obtained. This rear projection is useful for smallscale viewing or meeting. In case of front projection, a large image is enabled and the movement of image is possible by the movement of projection lens and screen. However, the quality of picture is deteriorated due to external light. In the first embodiment, the following modified operations can be possible.

First, in the front/rear projection selector, front projection can be performed by opening screen 14 and rear projection by closing it, not by pre-reflection mirror 12.

In addition, it is possible that pre-reflection mirror 12 is fixed and both-sided full reflection coated pre-reflection mirror 13 is used so that it is rotated 90° at the light axis for front/rear projection.

As pre-reflection mirror 2, a half mirror or polarized beam splitter (PBS) is used to divide light into half (the half mirror dividing the light intensity into half, and the PBS dividing the polarized light into half). Pre-reflection mirror 5 can select the output of slide film 10 or LCD 8. In this case, the brightness of the slide portion is reduced into half. The LCD maintains the brightness when the PBS is used. When the half mirror is used, the brightness is reduced into half. Here, the LCD has light collecting lens 6, LCD 8, and polarizing plates 7 and 9. The slide portion has slide film inserter (not shown) and light collecting lens 6'. This will be the same in the following embodiments. Mirrors 12 and 13 behind projection lens 11 can be changed, if necessary, in the number of mirrors or directions.

Second Embodiment

Figure 4:
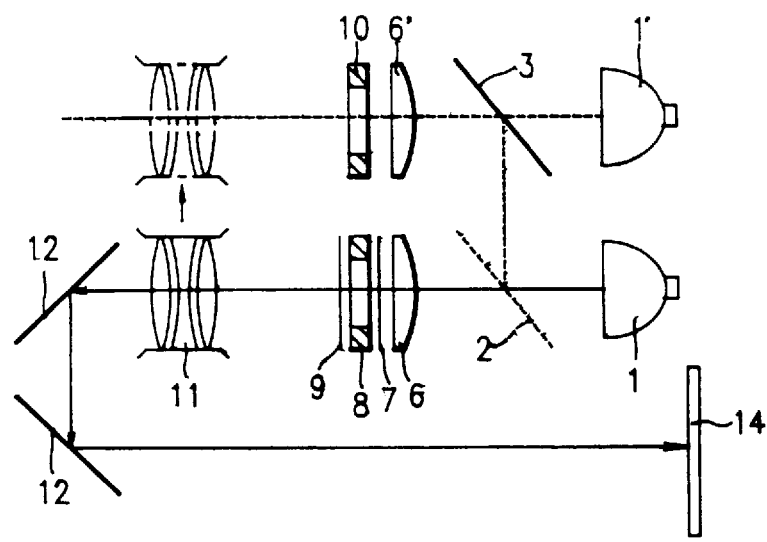

Referring to FIG. 4, the second embodiment is constructed to select the display of slide or LCD by moving projection lens 11. The selection of front or rear projection can be performed according to the methods described in the first embodiment.

An additional driving method can be formed by driving (moving) pre-reflection mirror 12 and projection lens 11. For the front projection of slide, only projection lens 11 is moved (mirror 12 being opened). For the front projection of LCD 8, only pre-reflection mirror 12 is moved. In case of rear projection, the magnification is increased than in the slide or LCD projection.

For the selection of display by the slide portion or LCD, switching from a ballast (not shown) commonly used to light sources 1 and 1' to light sources 1 and 1' is performed. The driving of the slide portion or LCD and front or rear projection is the same as above.

Third Embodiment

Figure 5:
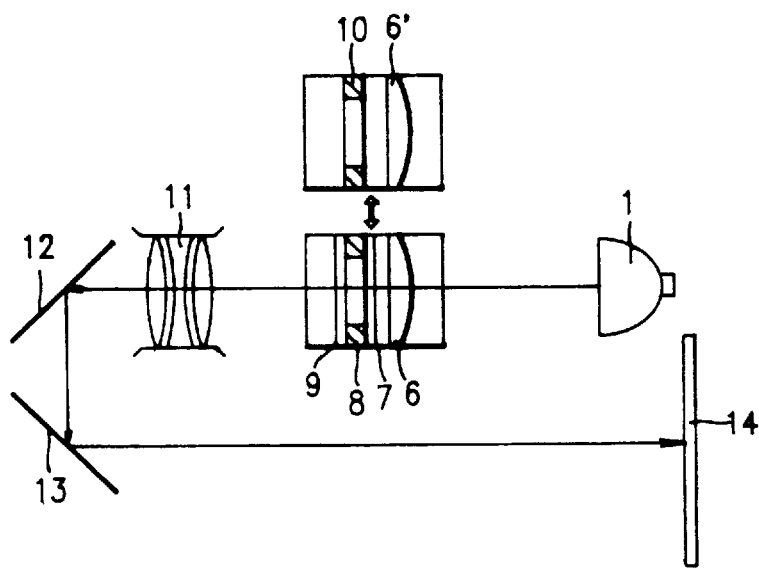
Figure 6:
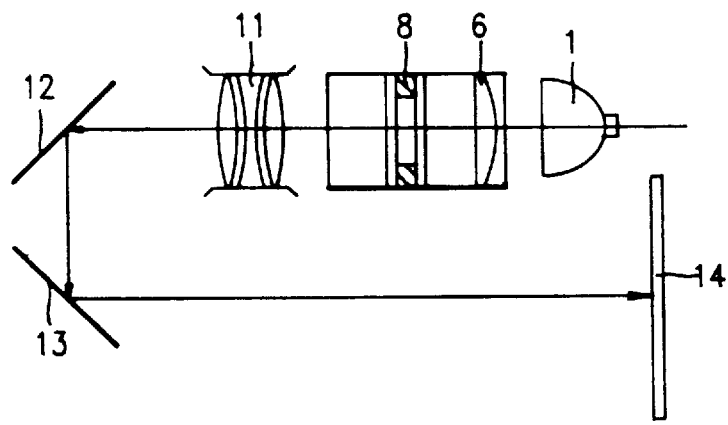

Referring to FIG. 5, the third embodiment operates by replacing the LCD with the slide portion, and vice versa. Though not shown in the drawing, a driving mechanism for detaching or attaching slide film 10 from the tray to the slide film inserter is placed in the replacing portion of the optical system so as not to interrupt the light path, regardless of the replacement of the LCD and slide portion.

In this embodiment, the driving selection of the LCD or slide portion is performed by mechanically placing the LCD or slide portion along the light path between light source 1 and projection lens 11 according to the selection mode. When the slide is selected, the operation of the driving circuit is interrupted by a microcomputer (not shown), reducing power consumed.

The replacement of mechanical position can be performed by detaching or attaching the LCD or slide portion. In FIG. 5, the replacement can be performed by moving up and down or left and right the LCD when the slide is used.

The configuration of this embodiment is advantageous in using light collecting lenses 6 and 6'. This performs illumination appropriate for the respective cases and simplifies a mechanism driving when the respective modes are selected.

The selection of LCD 8 or slide film 10 is performed by the mechanical replacement of the LCD or slide portion. The front/rear driving is independently performed by moving (rotating) pre-reflection mirror 12.

Fourth Embodiment

Figure 7A:
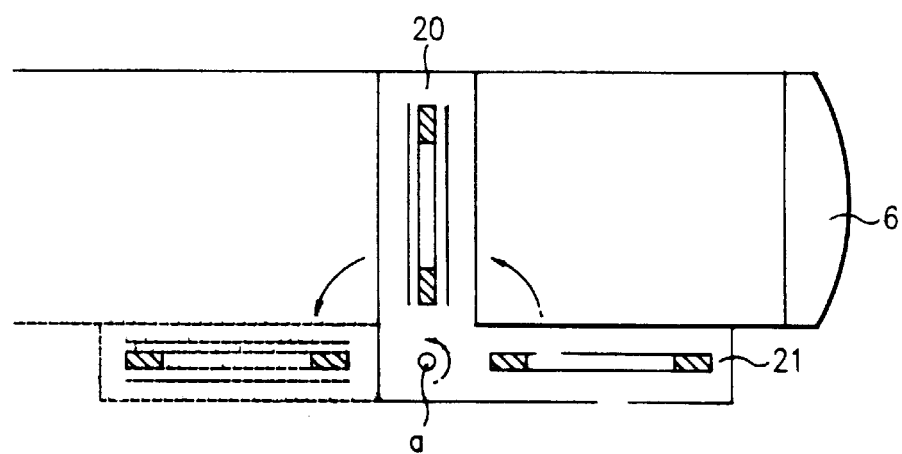
FIGS. 7A, 7B and 7C illustrate examples of method of replacing image devices according to the fourth embodiment of the present invention.

The fourth embodiment is simpler than the third embodiment in configuration. In this embodiment, the optical system is commonly used, and LCD 8 and slide film 10 are mechanically replaced. A mechanical method of replacing the LCD and slide portion can be explained in the following example (referring to FIG. 7A).

In the optical system made up of light source 1, light collecting lens 6, display devices 8 and 10 and projection lens 11, an L-shaped structure is formed in the display devices to rotate 90° at the rotation axis a of one portion of the lower portion of the optical system. One portion 20 integrally forms incident/outgoing polarizing plates 7 and 9 and LCD 8. Other portion 21 mounts slide film 10. When the structure rotates 90°, the LCD or slide film mounting portion is placed along the light path, allowing the LCD or slide to be selected. The slide film mounting portion is placed horizontally along the light path.

Figure 7B:
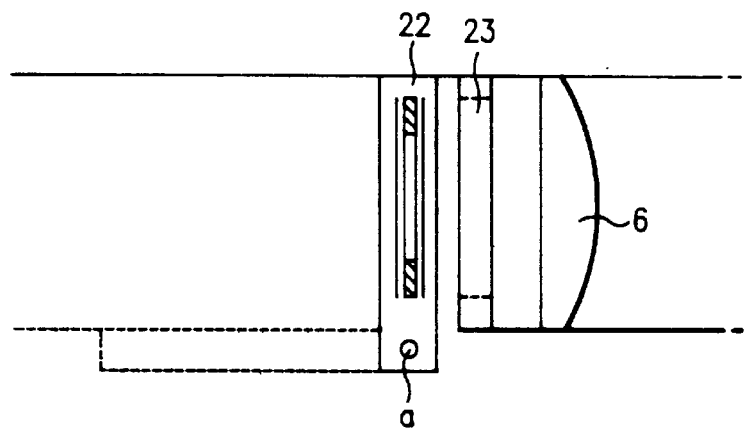

For another example, as shown in FIG. 7B, the slide portion or LCD is placed in series and a rotation axis a is provided in a portion 22 for fixing LCD 8. When the slide is selected, the LCD is mechanically taken aside from the light path (according to the arrow drawn) to project slide film 10. When LCD 8 is used, light is incident or outgoing on/from LCD 8 through hole 23 where slide film 10 is mounted. In this case, focusing by projection lens 11 is required because projection states are different in the respective cases.

Figure 7C:
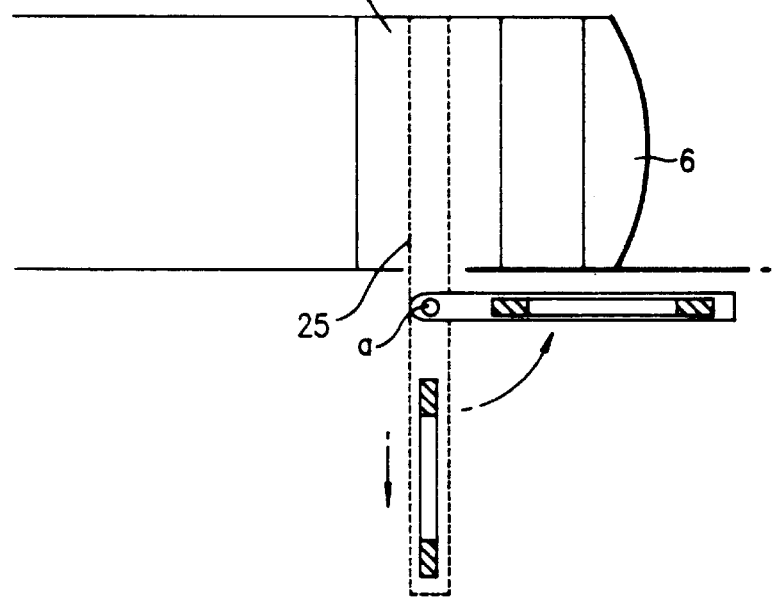

For still another example, as shown in FIG. 7C, a mechanical frame 24 where slide film 10 and LCD 8 are mounted is provided where the display devices are placed. In LCD 8, a mechanical frame corresponding to the frame of slide film 10 is provided. Pins are installed on the left and right of the top of the frame so that, when the slide is used, it falls down along the guide groove of the optical system and is folded by 90° as shown in the arrow drawn. By doing so, slide film 10 is mounted. When LCD 8 is used, the reverse process is performed. Here, rear/front projection can be performed in the aforementioned method.

Fifth Embodiment

Referring to FIG. 8, in the fifth embodiment of the present invention, there are provided projection lenses 11 and 11' for LCD and slide, respectively. The selection of the LCD or slide is performed by mode selecting mirror 2 placed between light source 1 and LCD 8 or slide film 10, that is, display devices.

When light emitted from light source 1 selects LCD 8 in mode selecting mirror 2, mode selecting mirror 2 is taken aside from the light path and the light is irradiated onto LCD 8. When the slide is selected, the light is changed 90° by mode selecting mirror 2 and irradiated onto slide film 10 by another direction converting mirror 3.

The front/rear projection is performed by front/rear projection mirror 12. When the front of the slide is driven, front/rear projection selecting mirror 12 is placed in front of LCD projection lens 11. When the rear of the slide is driven, front/rear projection selecting mirror 12 is placed in front of slide projection lens 11'. When the front of the LCD is driven, front/rear projection selecting mirror 12 is placed in front of slide projection lens 11'. When the rear of the LCD is driven, front/rear projection selecting mirror 12 is placed in front of LCD projection lens 11.

As a technical task of this embodiment, the optical efficiency of the LCD or slide portion must be maintained by a proper illumination system because the distance between light source 1 and LCD 8 or slide film 10 is different.

Sixth Embodiment

Referring to FIG. 9, the sixth embodiment is a modification of the fifth embodiment. In this embodiment, the driving of illumination system is selected by moving light source 1 (switching when two light sources 1 and 1' are used).

This is performed by placing light source 1 to an image to be selected and placing mirror 12 before projection lens 11 in front of slide projection lens 11' in case of LCD front projection. In case of LCD rear projection, mirror 12 in front of projection lens 11 is placed in front of LCD projection lens 11. In case of slide front projection, mirror 12' in front of projection lens 11' is placed in front of LCD projection lens 11. In case of slide rear projection, mirror 12' in front of projection lens 11' is placed in front of slide projection lens 11'.

Seventh Embodiment

Referring to FIG. 10, the seventh embodiment is a modification of the fifth embodiment. The selection of the LCD or slide is performed according to projection conditions not by the illumination system. For the mode selection means, PBS 2' in which light is polarized is used.

The light from the same lamp 1 is divided for the LCD and slide portion according to polarization by PBS 2'. In case of LCD projection selection, a cover 16 is provided on projection lens 11'. In case of slide selection, cover 16 is opened. Here, displaying is possible at the same time of the rear projection of LCD.

Closing of the opening of the film portion is usually taken in case that slide film 10 is not mounted, so as not to project a bright portion of the screen free of image information. Therefore, this method can be used, besides the cover.

The front and rear driving can be selected by driving mirror 12 in front of projection lens 11. Here, as described before, brightness is not reduced in the LCD because it provides images by the polarized light. Brightness is reduced into half in the slide portion.

However, the brightness efficiency is low in projecting the LCD so that a projector must be developed to implement the brightness on the screen. The illumination efficiency of slide is 25 times that of the LCD. Therefore, even though the brightness is reduced into half, which is yet 12 times, the slide can be sufficiently used in the rather bright environment.

Meanwhile, in the selection of display devices such as LCD 8 and slide film 10, a polarizing plate is installed between PBS 2' and LCD 8 or slide film 10 by utilizing the fact that PBS 2' divides light into polarized beams. The polarizing plates are rotated to interrupt or transmit the polarized beams so that light is irradiated onto LCD 8 or slide film 10, that is, display devices.

Eighth Embodiment

Referring to FIG. 11, the eighth embodiment forms front/rear projection lenses 11 and 11' individually.

Based upon a front type, front/rear projection selecting mirror 5 is installed between LCD 8 or slide film 10 and projection lenses 11 and 11'. Mirror 5 is moved (or rotated) to select the light path and projection lenses 11 and 11'.

In case of front projection, mirror 5 is rotated 45° or moved left and right so as to be taken aside from the light path. In case of rear projection, the light path of LCD 8 is changed by mirror 5 so that light is incident on rear projection lens 11' and an image is formed on screens 14 and 14' for rear monitor via direction converting mirrors 12 and 12'.

In the drawing, the full and dotted lines of mirrors 12 and 12' behind projection lens 11' are for front and rear projections, respectively. In this configuration, front/rear projection lenses 11 and 11' are different with respect to the set size, projection distance, and screen size, making the set compact and having a relatively large-screen rear monitor. The selection of the LCD and slide can be referred to that of the fourth embodiment.

Ninth Embodiment

Referring to FIG. 12, the ninth embodiment is constructed in such a manner that a Fresnel lens 17 for field lens is installed behind LCD 8 or slide film 10 and front/rear projection lenses 11 and 11' placed at different positions are provided. By moving Fresnel lens 17 up and down (or left and right), the light output from LCD 8 or slide film 10 is incident on projection lenses 11 and 11' so as to select modes. In the ninth embodiment, the selection of LCD or slide can be referred to that of the fourth embodiment.

In this embodiment, mode selection is performed by position selection of LCD 8 or slide film 10 and the movement of Fresnel lens 17, ensuring the compactness of the set and easy driving thereof. Basically, this configuration is characterized in large upward/downward projection. The full and dotted lines behind projection lens 11' indicate a case that the rear monitor is placed in front or rear of the set.

Tenth Embodiment

Referring to FIG. 13, in the tenth embodiment, another projection lens 11" is placed within the set to form a first image on a first image surface 10'. Reprojection is performed by the front projection lens 11. The slide portion forms a first image thereinside, whereas the LCD forms an image only by projection lens 11.

First, the illumination direction is selected by selecting mirror 2 of the illumination system. Projection is performed by projection selecting mirror 5 according to the method of the first embodiment. Image reversal on the screen which may be caused due to combined front and rear projections and is not described in the operation will be presented below.

The reversal of top and bottom or left and right of the image displayed can be performed by the LCD itself or a driving circuit. Therefore, an additional means needs not to be required in the optical system. Here, the reversal for the LCD will not be explained.

Meanwhile, in the first-seven and tenth embodiments of the present invention, in case of rear projection, direction is changed by two mirrors 12, 12' and 13 behind projection lens 11 to form an image at the rear of projection lens 11. The front projection is performed directly. However, since the direction from human eyes is the same, the top and bottom of the rear is reversed, when the front is taken as the reference. FIG. 14 shows the screen reversal due to the projection lens and a viewing state in case of front projection.

Explaining the reversal phenomenon, the top of mirror 12 must be placed near projection lens 11 in order to change the light output from projection lens 11 toward the bottom. In order to change the light path directed toward the bottom to the rear (the right in the drawing), a portion of the second mirror 13 corresponding to the top mirror 12 is placed at the bottom. At this time, the up and down reversal of the screen is performed.

In order not to cause such reversal, there is suggested a configuration in which the light path is changed to the rear and downward only by the first mirror 12. Here, this involves inconvenience in viewing because the vertical axis (optical axis) of the rear screen is directed downward. Correspondingly, in case that the mirror is installed so that the light path is changed upward and to the rear, the optical axis is directed upward, facilitating viewing. However, in this case, the light path must not be interrupted by the structure in the drawing of the third embodiment. This inconveniences detaching/attaching slide films from/to the tray.

In order to solve such problems, an intermediate mirror 12a is installed between first and second mirrors 12 and 13 to change the direction of front and rear. Explaining this from the view of basic characteristics through FIG. 16, first mirror 12 has a vertical slope smaller than 45°, directing downward and to the front of the light path. The second mirror 12a makes the light path direct downward and to the front. The third mirror 13 directs the light path to the rear. By doing so, the top and bottom of the light path is not changed not to cause reversal due to mirrors.

Figure 16:
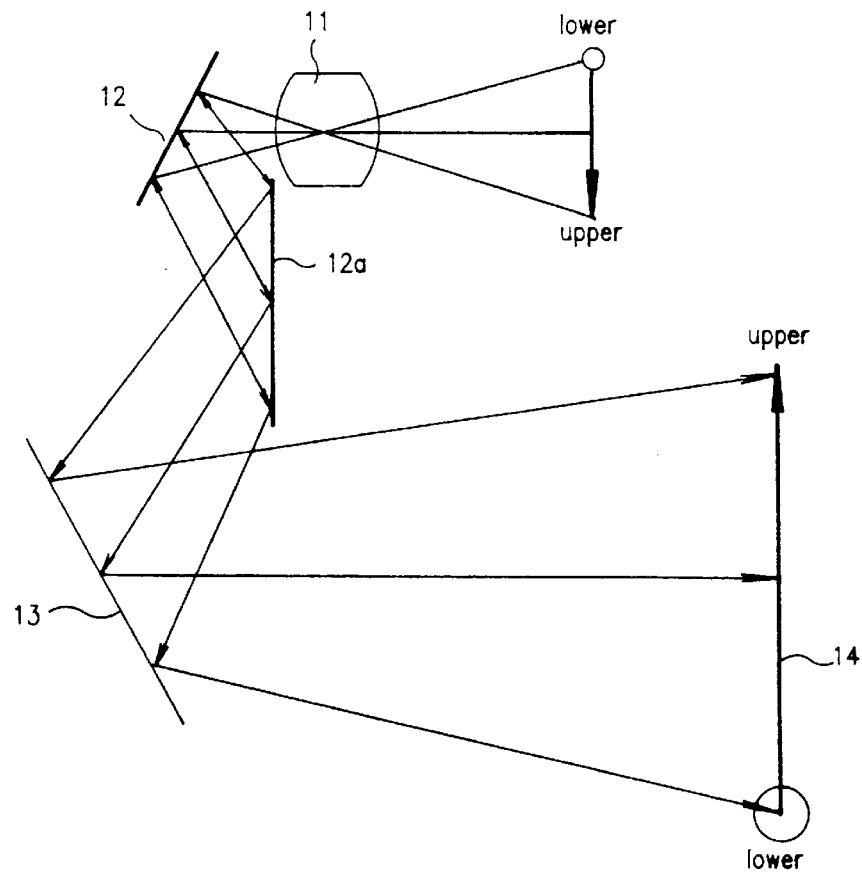
FIG. 16 illustrates a configuration to solve the reversal of top and bottom of image according to the present invention.

In the combined front and rear configuration, the optical system with the mirror behind the projection lens can be replaced with the configuration of FIG. 16, if necessary.

Figure 17:
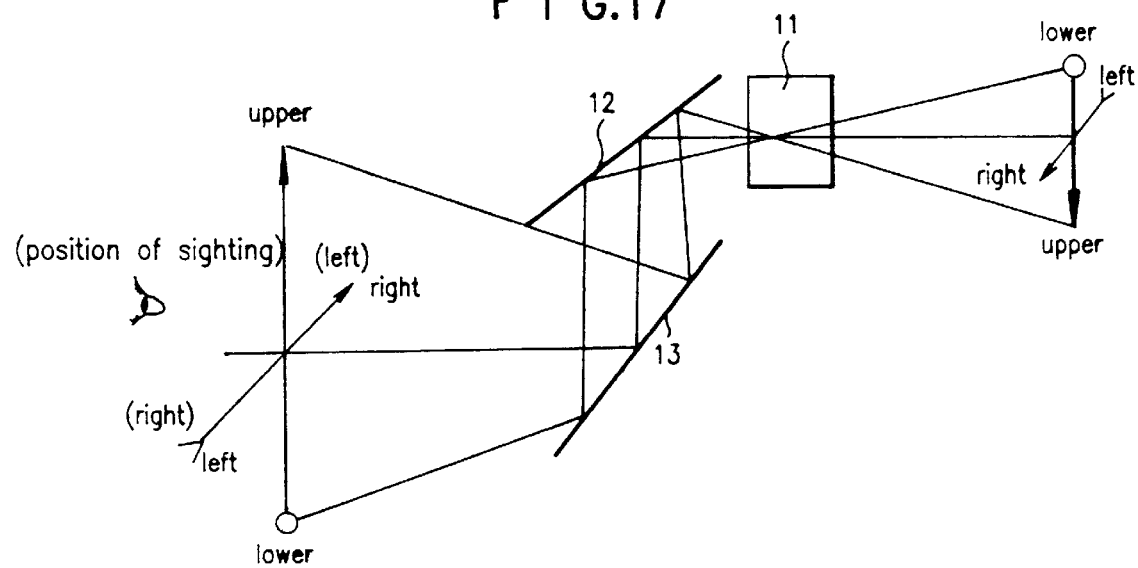
FIG. 17 illustrates the reversal of left and right of image by two mirrors.

A configuration of placing the screen for rear monitor in front can be considered as that of FIG. 17. In this case, in order to direct the light path by the first mirror 12, the top of mirror 12 must be placed near projection lens 11. In order to direct the light path in front (the left in the drawing), a portion of the second mirror 13 corresponding to the top of the light path must be directed upward. Here, the reversal of top and bottom is not caused. In case of the screen for rear monitor and rear projection, reversal of left and right is caused with respect to front projection according to positions viewed.

For this reason, a mirror for performing the reversal of left and right is required. Explaining this configuration with reference to the reversal of top and bottom, the first mirror is skewed left and right (including downward because of up and down slope) to change the light path to the left (or to the right). In order to cause the reversal of left and right, the second mirror is installed to have the opposite slope on the left and right (downward due to up and down slope, and the light path is directed to the rear by controlling the left and right slope). The third mirror is installed to direct the light path in front, causing only the reversal of left and right.

As described above, the present invention forms a display combined with a slide projector and liquid crystal projector for selecting LCD or slide films according to usage mode conversion, by forming the liquid crystal projector and slide projector as one set, which have the same basic configuration and similar-sized display devices. In addition, the present invention enables front or rear projection to be selected. Accordingly, the set size is minimized by commonly using the optical components, and expensive components are eliminated to reduce cost, as compared with the individual two sets. Furthermore, the present invention commonly uses a light source (metal lamp), increasing brightness and picture quality (color rendering) in the slide projector.

What is claimed is:

1. A projector for a slide film and a liquid crystal display comprising:

a light source for emitting a light for projecting an image onto a screen;

a first display for receiving and converting electrical image information into the image;

a second display having the image recorded thereon in a form of optical image information;

a display selecting means disposed between the first display and the second display for selecting one of the displays by deflecting a light path and directing the light to one of the displays; and, a projecting lens part for diverged projection of the image from the selected display onto the screen.

2. A projector as claimed in claim 1, wherein the display selecting means includes a first mirror for deflecting the light path and directing the light to one of the first display or the second display, and a second mirror for selecting and deflecting the light path on a back side of the first and second displays.

3. A projector as claimed in claim 1, further comprising a screen selecting means disposed on a light output side of the projecting lens part for reflecting and deflecting the light path so that the image is selectively projected onto a screen in front of or in back of the light source.

4. A projector as claimed in claim 1, wherein the projecting lens part has a first projecting lens and a second projecting lens disposed on light paths of the first and second displays, respectively.

5. A projector as claimed in claim 4, wherein the projecting lens part includes a first projecting lens for diverged projection of the image, and a second projecting lens disposed on a first light path of first and second light paths for compensating a difference between the first light path and the second light path.

6. A projector for a slide film and a liquid crystal display comprising:

a light source for emitting a light for projecting an image onto a screen;

a first display for receiving and converting electrical image information into the image;

a second display having the image recorded thereon in a form of optical image information;

a first selecting means for deflecting a light path and directing the light to one of the first display or the second display; and, a second selecting means for selecting the light path from the display selected by the first selecting means for diverged projection of the image.

7. A projector for a slide film and a liquid crystal display comprising:

a light source for emitting a light for projecting an image onto a screen;

a first display for receiving and converting electrical image information into the image;

a second display having the image recorded thereon in a form of optical image information;

a light splitting means for splitting the light to direct to the first display and the second display; and a display selecting means for selecting a display by moving a projecting lens to one of the light paths from the first display or the second display.

8. A projector as claimed in claim 7, wherein the light splitting means is a polarizing beam splitter.

9. A projector as claimed in claim 7, wherein the light splitting means is a half mirror.

10. A projector for a slide film and a liquid crystal display comprising:

a light source for emitting a light for projecting an image onto a screen;

a first display for receiving and converting electrical image information into the image;

a second display having the image recorded thereon in a form of optical image information;

a display selecting means for selecting one of the displays by moving the light source to one of the first display or the second display; and, a projecting lens part for diverged projection of the image on the selected display.

11. A projector as claimed in claim 10, wherein the projecting lens part includes a first projecting lens for diverged projection of the image on the first display, and a second projecting lens for diverged projection of the image on the second display.

12. A projector for a slide film and a liquid crystal display comprising:

a light source for emitting a light for projecting an image onto a screen;

a first display for receiving and converting electrical image information into the image;

a second display having the image recorded thereon in a form of optical image information;

a display selecting means for selecting and moving one of the first display or the second display to a light path; and, a projecting lens part for diverged projection of the image on the display selected by the display selecting means onto the screen.

13. A projector as claimed in claim 12, wherein the display selecting means is a rotatable shaft which moves the selected first display or second display into the light path.

14. A projector as claimed in claim 12, wherein the display selecting means is a rotatable shaft which inserts one display into the light path, while the other display is removed from a slot on the light path, independently.

15. A projector as claimed in claim 12, wherein the display selecting means makes one display slide into a guide slot on the light path, while the other display is removed from a slot on the light path, independently.

16. A projector as claimed in claim 12, further comprising light path deflecting means, disposed on a light output side of the first display and the second display, for deflecting the light path to the first projecting lens and the second projecting lens.

17. A projector as claimed in claims 16, wherein the light path deflecting means is a set of reflecting mirrors for reflecting and deflecting the light.

18. A projector as claimed in claim 16, wherein the light path deflecting means is a Fresnel lens for refracting and transmitting the light.

* * * * *